United States Patent [19]

Reynard

[11] 4,439,642

[45] Mar. 27, 1984

[54] HIGH ENERGY ULTRASONIC TRANSDUCER

[75] Inventor: John M. Reynard, Framingham, Mass.

[73] Assignee: Polaroid Corporation, Cambridge, Mass.

[21] Appl. No.: 334,731

[22] Filed: Dec. 28, 1981

[51] Int. Cl.³ .................................. H04R 19/00
[52] U.S. Cl. .......................... 179/111 R; 179/111 E; 179/106
[58] Field of Search .............. 179/111 R, 106, 111 E; 310/309

[56] References Cited

U.S. PATENT DOCUMENTS

| | | | |
|---|---|---|---|
| 1,085,297 | 4/1978 | Paglia | 179/111 R |
| 2,199,432 | 5/1940 | Horkheimer | 179/111 R |
| 3,787,642 | 1/1974 | Young, Jr. | 179/111 E |
| 3,816,671 | 6/1974 | Fraim et al. | 179/111 E |
| 3,908,098 | 9/1975 | Kawakami | 179/111 R |
| 4,081,626 | 3/1978 | Muggli et al. | 179/111 R |

FOREIGN PATENT DOCUMENTS 46-35035   8/1971   Japan ......................... 179/111 R Primary Examiner—A. D. Pellinen
Assistant Examiner—Robert Lev
Attorney, Agent, or Firm—John J. Kelleher

[57] ABSTRACT

The energy storage and transmission capabilities of a capacitance-type electroacoustical transducer are increased and the cost of producing such a transducer can be decreased by employing a thin, dielectric coating material between the electrically conductive diaphragm and backplate of said transducer, and by locating the electrically conductive diaphragm support layer on what would otherwise be an exposed outer diaphragm surface to protect same from physical as well as environmental damage.

16 Claims, 6 Drawing Figures

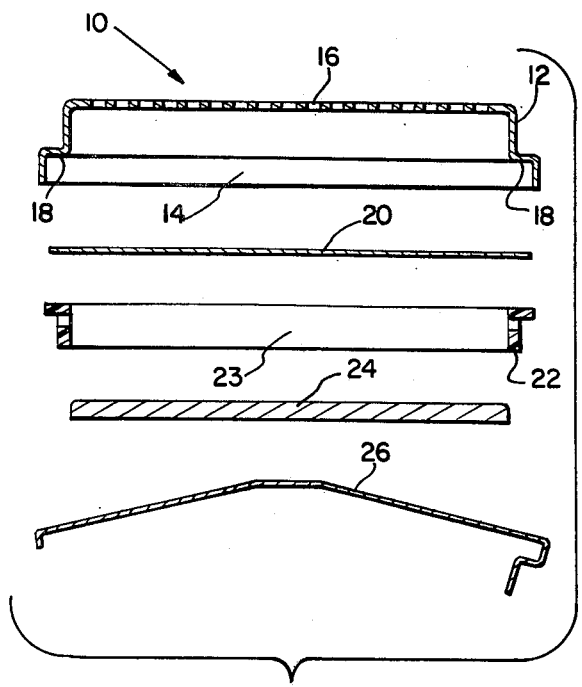
FIG. IA
(PRIOR ART)
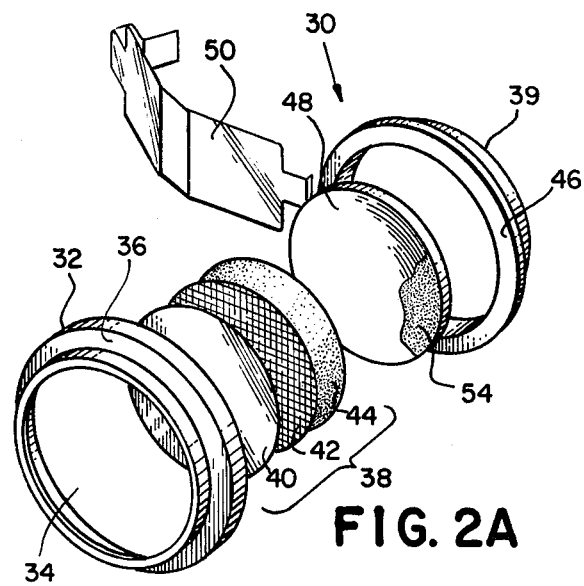
FIG. 2A
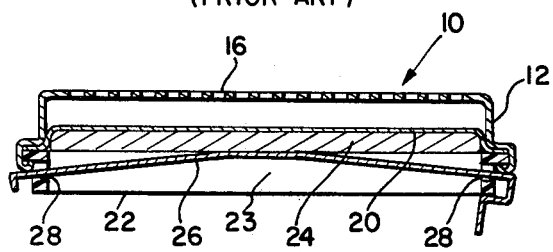
FIG. IB
(PRIOR ART)
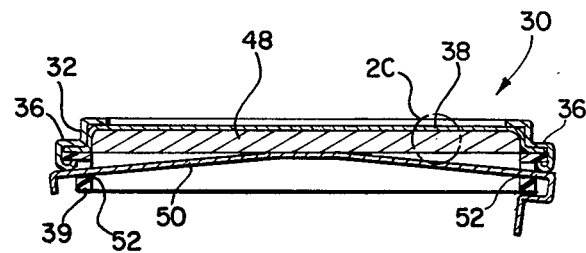
FIG. 2B
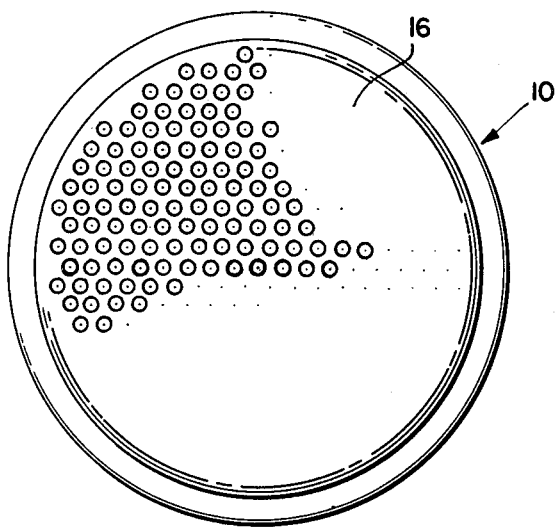
FIG. IC
(PRIOR ART)
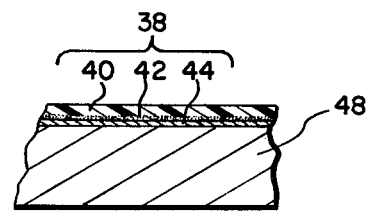
FIG. 2C

HIGH ENERGY ULTRASONIC TRANSDUCER

BACKGROUND OF THE INVENTION

1. Field of the Invention

The present invention relates to electroacoustical transducers in general, and to the fabrication and configuration of components within such a transducer, in particular.

2. Description of the Prior Art

Capacitance-type electroacoustical transducers are well known in the prior art. In such transducers, a diaphragm having an insulative layer and an electrically conductive surface has its insulative layer in contact with a grooved, irregular, electrically conductive surface of a substantially inflexible disc or backplate. The periphery of the diaphragm is maintained in a fixed position with respect to a portion of the housing of said transducer and a spring force urges said backplate into tensioning engagement with said diaphragm. The insulative layer, the electrically conductive surface of said diaphragm constituting a first electrode, and the conductive surface of said backplate constituting a second electrode, form a capacitor such that when a DC bias voltage is applied across said electrodes, irregularities in said backplate surface set up localized concentrated electric fields in said insulative layer. When an AC signal is superimposed on said DC bias, the insulative layer is stressed such that oscillatory formations develop causing an acoustical wavefront to be propagated from the diaphragm. A received acoustical wavefront impinging on the insulative layer produces a variable voltage across said capacitor electrodes in the presence of a bias.

The ability to store electrical energy in a capacitance-type transducer and subsequently propagate or transmit at least a portion of this energy in the form of an acoustical wavefront is largely determined by transducer capacitance. Being able to store more energy in a capacitance-type transducer and subsequently transmit same would either enable such energy to be transmitted further or allow smaller transducers to be employed to transmit the desired amount of energy over any given distance. The capacitance of a capacitance-type transducer has often been described by the relationship $C = m(KA/d)$ where:

C = capacitance, in farads;
m = proportionality constant;
K = dielectric constant;
A = effective area of capacitor plates; and
d = distance between plates.

One prior art capacitance-type transducer employs an insulative polyamide film, sold by Dupont Corporation under its registered trademark KAPTON, that is positioned between an electrically conductive aluminum backplate and an extremely thin layer of gold (300A) that has been vapor deposited on said KAPTON film. Gold is employed primarily because it does not oxidize when exposed to air for extended periods of time. The gold layer and aluminum backplate correspond to the "plates" of a capacitor and the KAPTON film provides the dielectric constant and establishes the distance "d" between said "plates".

As can be seen in the above equation, distance "d" between the "plates" of a capacitance-type transducer, which is solely determined by the thickness of the above-mentioned KAPTON film, has a substantial effect on transducer capacitance. A film having a thickness of approximately 0.3 mil is the smallest thickness film commercially available that includes all of the qualities that are necessary for a suitable dielectric layer in a capacitance-type transducer which places a limitation on the magnitude of the transducer capacitance that can be achieved, at least as far as manipulating the distance between the transducer diaphragm and backplate is concerned. In addition, the housing of prior art capacitance-type transducers include a protective screen structure to prevent physical damage to the above-mentioned vapor-deposited gold diaphragm layer of said capacitance-type transducer. This protective screen increases transducer cost and attenuates the amount of acoustical energy that can effectively be transmitted by such a transducer.

SUMMARY OF THE INVENTION

In accordance with the teachings of the present invention, a relatively low-cost, capacitance-type electroacoustical transducer assembly is disclosed having substantially increased energy storage and transmission capabilities. The transducer comprises a housing-supported electrically conductive diaphragm and backplate with an extremely thin dielectric coating interposed between said diaphragm and said backplate, the addition of such a coating causing a substantial increase in the capacitance and therefore the energy storage and transmission capabilities of said transducer. In addition, a protective/support layer covers the otherwise exposed outer surface of said diaphragm to thereby eliminate the need to protect said diaphragm from potential environmental and/or physical damage. Also, utilizing a protective layer on said diaphragm surface eliminates the need for a protective signal-attenuating housing to protect the diaphragm from physical damage and allows some base metals to be employed in the transducer diaphragm because the otherwise exposed metal surface would be sufficiently isolated from the environment in which it must operate, an environment that may cause such metals to oxidize.

BRIEF DESCRIPTION OF THE DRAWINGS

FIG. 1A is an exploded elevational view, partly in section, of a capacitance-type transducer constructed in accordance with the prior art.

FIG. 1B is an elevational view, partly in section, of the transducer of FIG. 1A, fully assembled.

FIG. 1C is a top view of the transducer of FIG. 1B.

FIG. 2A is an exploded perspective view of a capacitance-type transducer constructed in accordance with the present invention.

FIG. 2B is an elevational view, partly in section, of the transducer of FIG. 1B, fully assembled.

FIG. 2C is an enlargement of detail 2C in FIG. 2B

DESCRIPTION OF THE PREFERRED EMBODIMENTS

In order to more clearly describe the inventive concept of the present invention, a brief description of a capacitance-type transducer over which the present invention is an improvement, will be presented. Referring now to the drawings and specifically to FIG. 1A, an electroacoustical transducer 10 constructed in accordance with the teachings of the prior art is depicted. Transducer 10 includes cylindrical housing 12 having open end 14 and partially closed perforated end 16 at the opposite end thereof. Housing 12 also includes flanged portions 18 near opened end 14 of said housing 12. Slot vibratile diaphragm 20 extends across opening 14 and is positioned between diaphragm support ring 22 and said housing 12. Diaphragm 20 includes an insulative layer of polyamide film on which an extremely thin layer of gold (approximately 300A) has been vapor deposited. Diaphragm support ring 22 is of circular cross section with an opening 23 through the center thereof and has a flanged end for cooperative engagement with flange portion 18 of housing 12. Backplate 24, of circular cross section, includes a slightly crowned electrically conductive surface for cooperative engagement with the insulative layer of diaphragm 20. Leaf spring 26 provides the force that maintains backplate 24 in cooperative engagement with diaphragm 20. When assembled, the transducer components described in FIG. 1A are in the position shown in FIG. 1B.

FIG. 1B is a sectional view, in elevation, of the transducer components illustrated in FIG. 1, fully assembled. The transducer of FIG. 1B is assembled by placing a uniform radial force on diaphragm 20 for the purpose of maintaining said diaphragm in a relatively flat plane and then positioning said diaphragm over opening 14 (FIG. 1) of housing 12, such that the gold layer of diaphragm 20 is toward perforated end 16 of said housing 12. With diaphragm 20 maintained in this planar orientation, the periphery of diaphragm 20 is sandwiched between the flanged end of insulative ring 22 and flange portion 18 of housing 12, and then the open end of housing 12 is crimped onto said insulative ring 22 which places the periphery of diaphragm 20 in a fixed position with respect to said housing 12. Backplate 24 is placed in opening 23 of support ring 22 such that the slightly crowned surface of said backplate 24 engages the insulative layer of diaphragm 20 and forms said diaphragm 20 into the same general shape as the crowned surface of said backplate 24. With backplate 24 so positioned, leaf spring 26 is inserted through openings 28 in support ring 22 such that the center flat portion of leaf spring 26 presses against backplate 24 and the ends of leaf spring 26 rests against the walls in opening 28 of support ring 22. With leaf spring 26 so positioned, diaphragm 20 remains formed to the general shape of the crowned surface of backplate 24.

FIG. 1C is a top view of transducer housing 12 which is a plan view of perforated end 16 of said housing 12 as it is shown in FIG. 1B. Perforated end 16 provides two very important interrelated functions for transducer 10. One function is the protection of the extremely thin gold outer layer of diaphragm 20 from direct physical injury. Damage to this layer may drastically affect transducer acoustical energy transmission and reception capabilities. Another function provided by said perforated housing end 16 is that it enables an acoustical wavefront to be transmitted and/or sensed by diaphragm 20. If a protective function is to be provided by housing end 16, there must be one or more openings therein of sufficient magnitude for the passage of acoustical energy therethrough.

Turning now to the present invention, and specifically to FIG. 2A, an exploded perspective view of capacitance-type electroacoustical transducer 30 incorporating a preferred embodiment of the present invention is depicted. In FIG. 2A, transducer 30 includes cylindrical housing 32 having central opening 34, of circular cross section, through its longitudinal center. Cylindrical housing 32 includes flange portion 36 extending laterally therefrom near one end thereof. Flat vibratile diaphragm 38 extends across that end of housing opening 34 near flange 36 of housing 32 between diaphragm support ring 39 and said housing 32. Diaphragm 38 consists of three distinctive layers 40, 42 and 44 that are formed in situ into a single vibratory unit before being assembled into transducer 30. These three layers have been artificially shown spaced from one another in FIG. 2A in order to facilitate describing the makeup of diaphragm 38. Layer 40 of diaphragm 38 is the above-mentioned 0.3 mil polyamide film which is also referred to herein as KAPTON. The next layer 42 is an aluminum foil layer which has been vapor deposited by conventional means to a thickness of from 800 to 1,000 A onto one surface of said KAPTON film. Third or dielectric layer 44 of diaphragm 38 may be a coating of silicon, silicon dioxide or glass that has been vapor deposited in situ on the outer surface of said aluminum layer to the same order of magnitude thickness as said aluminum layer. Diaphragm support ring 39 is of circular cross section with an opening through the center thereof and has a flanged end 46 for cooperative engagement with flange portion 36 of cylindrical housing 32. Backplate 48, of circular cross section, includes a slightly crowned, irregular, and grooved electrically conductive surface for cooperative engagement with diaphragm 38. Leaf spring 50 provides the physical force that maintains backplate 48 in cooperative engagement with diaphragm 38. When fully assembled, the transducer components described in FIG. 2A are in the positions shown in FIG. 2B.

FIG. 2B is a sectional view, in elevation, of the transducer components illustrated in FIG. 2A, fully assembled. The transducer of FIG. 2B is assembled by placing a uniform radial force on diaphragm 38 for the purpose of maintaining said diaphragm in a relatively flat plane, and then positioning said diaphragm 38 within the flanged end opening 34 that extends through housing 32. With diaphragm 38 maintained in this planar orientation and with layer 40 of said diaphragm 38 facing said housing 32, the periphery of said diaphragm 38 is sandwiched between flanged end 46 of ring 39 and flanged portion 36 of housing 32, and then the outer portion of flange 36 is crimped onto said ring 39 which places the periphery of diaphragm 38 in a fixed position with respect to said housing 32. Crowned backplate 48 is placed within support ring 39 such that the crowned surface of said backplate 48 engages the glass, silicon or silicon dioxide surface of diaphragm 38 and forms said diaphragm 38 into the same general shape as the crowned surface of said backplate 48. With backplate 48 so positioned, leaf spring 50 is inserted through openings 52 in support ring 39 such that the center portion of leaf spring 50 presses against backplate 48 and the ends of leaf spring 50 rest against the walls in openings 52 of support ring 39.

As shown in FIG. 2C, which is an enlargement of detail 2C in FIG. 2B, with leaf spring 50 so positioned, backplate 48 presses against dielectric layer 44 of diaphragm 38 thereby tensioning said diaphragm 38, together with its above-described constituent layers 40, 42 and 44, to the desired diaphragm tension force level for proper transducer 30 operation.

DISCUSSION

In the above-described preferred embodiment of the present invention, the dielectric layer between metal foil layer 42 and backplate 48 is preferably provided by vapor depositing such dielectric materials as silicon, silicon dioxide, glass, etc., in situ on the inward facing metal foil surface. A less desirable technique would be to add the dielectric layer during transducer assembly. An alternate, though less capacitance producing arrangement would be to anodize (i.e., infuse or disperse oxygen into), the grooved, irregular surface of aluminum backplate 48 which is represented by dielectric coating or layer 54 in FIG. 2A, and this coating would be a substitute for the above-mentioned vapor deposited dielectric layer on metal foil layer 42. If a metal other than aluminum were employed for backplate 48, in certain instances an oxide of such other metal may also be employed as the transducer dielectric.

Anodizing aluminum foil layer 42 of transducer 30 would be impractical because the anodizing layer would have to be several orders of magnitude thicker than the metal foil layer which would produce a transducer diaphragm that would be much too heavy to effectively transmit sufficient quantities of object detecting acoustical energy at ultrasonic frequencies.

The primary function of polyamide or KAPTON film layer 40 in diaphragm 38 of transducer 30 is to provide a physical support for aluminum foil layer 42 and, if employed in this manner, to support dielectric layer 44 also. As noted above, aluminum foil layer 42 is approximately 1,000 A thick and dielectric layer 44 has the same order of magnitude thickness. Inasmuch as one angstrom (A) is equal to one ten-billionth of a meter, it is clear that neither aluminum layer 42 nor dielectric layer 44 have sufficient thickness and/or substance to be supported without aid of a film or support layer 40. An important requirement of film layer 40 is that its mass be low relative to the mass of the conductive diaphragm layer such as aluminum foil layer 42.

In addition to its support function for foil layer 42, film layer 40 of diaphragm 38 also protects the aluminum foil or other such base metal layers from physical as well as environmental damage. Physical protection is provided in prior art transducer 10 (FIGS. 1A, 1B) by perforated housing end 16. However, in transducer 30 of the present invention, film layer 40 completely covers the outward-facing surface of foil layer 42, thereby making additional protective structure unnecessary. The absence of additional protective structure avoids any acoustical signal attenuation that may be caused by such structure. Protective film layer 40 introduces no such signal attenuation problems primarily because it forms a portion of diaphragm 38 and vibrates therewith.

The close, intimate contact between film layer 40 and metal foil layer 42 and, if utilized, dielectric layer 44, either reduces or prevents contact between metal foil layer 42 and its environment. By reducing or preventing such contact, oxidation, for example, of metal foil layer 42 is either reduced or prevented, thereby enabling less costly base metals such as aluminum to be utilized as the metal foil layer in place of more expensive noble metals such as gold and silver or the like. An additional advantage of having a protective outer film layer such as layer 40 over metal foil layer 42 in transducer 30 is that a less expensive base metal layer such as aluminum can be made to look like a more expensive noble metal such as gold if the proper coloring is chosen for said outer film layer.

When selecting dielectric coating materials for inclusion between metal foil layer 42 and backplate 48 of transducer 30 of the present invention, it is essential that the thickness of any selected material be reduced at a substantially greater rate than its dielectric constant. If all other factors affecting transducer capacitance remain the same while the dielectric constant and thickness of a selected dielectric material change at the same rate from a previously selected material, there would be no net change in transducer capacitance.

The polyamide film layer of diaphragm 20 in prior art transducer 10 depicted in FIGS. 1A and 1B provides the dielectric material between the conductive layer of diaphragm 20 and transducer backplate 24 and therefore the film layer of diaphragm 20 must necessarily be an insulator. However, in transducer 30 which embodies the inventive concept of the present invention, film layer 40 of diaphragm 38 in transducer 30 may be constructed of either conductive or insulative materials so long as the material selected has the qualities necessary to produce the desired acoustical wavefront.

In prior art transducer 10 (FIG. 1B), the electrically conductive layer of diaphragm 20 is in direct physical contact with electrically conductive housing 12 and therefore, electrical connection to said conductive diaphragm layer is made by connecting to said housing 12. By contrast, in transducer 30 of the present invention, a small area of the metal foil layer would be masked off prior to the vapor deposition of dielectric material on said metal foil layer, and subsequent connection to the conductive metal foil layer would be made through said small masked off foil area.

It will be apparent to those skilled in the art by the foregoing description of my invention that various improvements and modifications can be made in it without departing from its true scope. The embodiments described herein are merely illustrative and should not be viewed as the only embodiments that might encompass my invention.

What is claimed is:

1. An electroacoustical transducer assembly, comprising:
   a backplate member;
   a flexible vibratile diaphragm comprising a relatively thin conductive film affixed to a flexible support layer with said conductive film facing toward a surface of said backplate member and said supporting layer facing away from said backplate surface; and
   a solid dielectric layer having a thickness that is less than the thickness of said flexible support layer and that is sandwiched between and in contact with facing surfaces of said backplate member and said conductive diaphragm film.

2. The transducer of claim 1 wherein said supporting layer provides an outer surface of said transducer and protection as well as support for said conductive film.

3. The transducer of claim 1 wherein said supporting layer is of low mass relative to the mass of said conductive film.

4. The transducer of claim 1 wherein said conductive film is a thin layer formed in situ on said supporting layer.

5. The transducer of claim 1 wherein said dielectric layer is a thin layer formed in situ on one of said facing surfaces.

6. The transducer of claim 5 wherein said dielectric layer is an oxide of said one facing surface.

7. The transducer of claim 5 wherein said dielectric layer is formed by deposition on said one facing surface.

8. The transducer of claim 5 wherein said dielectric layer is formed by vapor deposition.

9. The transducer of claim 5 wherein said dielectric layer comprises silicon.

10. The transducer of claim 5 wherein said dielectric layer is glass.

11. The transducer of claim 5 wherein said backplate is aluminum and said dielectric layer is the oxide thereof formed in situ on said backplate.

12. The transducer of claim 1 wherein said dielectric layer comprises silicon dioxide.

13. The transducer of claim 1 wherein said dielectric layer is a dielectric compound of silicon.

14. The transducer of claim 11 wherein one facing surface of said backplate is aluminum and said dielectric layer is an electrolytically formed oxide layer thereof.

15. A capacitance-type electroacoustical transducer assembly, comprising:

a housing member;

a vibratile diaphragm having a conductive layer and a support layer for supporting said conductive layer, with at least a portion of said support layer being supported by said housing member;

a backplate member;

a dielectric coating interposed between said conductive diaphragm layer and said backplate member; and means for urging said backplate member and said conductive diaphragm layer into engagement with said dielectric coating.

16. The apparatus of claim 15, wherein said conductive layer is in intimate contact with said support layer for vibration therewith.

* * * * *